United States Patent [19]

Shiba et al.

[11] Patent Number: 4,991,047
[45] Date of Patent: Feb. 5, 1991

[54] TAPE GUIDES AND METHOD OF MANUFACTURING THE SAME

[75] Inventors: Haruo Shiba, Komoro; Masatoshi Okamura; Takashi Namioka, both of Saku; Takayuki Kohama, Yokohama, all of Japan

[73] Assignees: TDK Corporation, Tokyo; Sanshin Kogyo Kabushiki Kaisha, Kanagawa, both of Japan

[21] Appl. No.: 268,418

[22] Filed: Nov. 8, 1988

[30] Foreign Application Priority Data

Nov. 9, 1987 [JP] Japan .................................. 62-280986
Sep. 2, 1988 [JP] Japan .................................. 63-218394

[51] Int. Cl.$^5$ ............................................. G11B 15/60
[52] U.S. Cl. .................................................. 360/130.21
[58] Field of Search ............... 360/132, 130.2, 130.21; 226/190, 194, 196; 242/199

[56] References Cited

U.S. PATENT DOCUMENTS 3,991,956  11/1976  Machida .............................. 226/196
4,736,904  4/1988  Schoettle et al. ..................... 226/196
4,819,890  4/1989  Carroll ................................. 242/199

FOREIGN PATENT DOCUMENTS 0149890  6/1988  Japan ............................. 360/130.21

Primary Examiner—David J. Severin
Attorney, Agent, or Firm—Seidel, Gonda, Lavorgna & Monaco

[57] ABSTRACT

Tape guides for a magnetic tape cassette comprise a half of cylindrical tube each adapted to fit securely over a support post within the housing of the cassette. The method of manufacturing the guides consists of forming thin-walled portions as grooves on at least the inner or outer side of a tube, with or without inwardly protruding ribs, which facilitate the division and provide a tight fit of the half piece to the post, and then dividing the tube along the plane into two halves. The tube is made of a metal, particularly brass or stainless steel, or plastics and formed by drawing or other irregular-shape forming technique, with polishing, plating, and/or precision polishing before division.

11 Claims, 3 Drawing Sheets

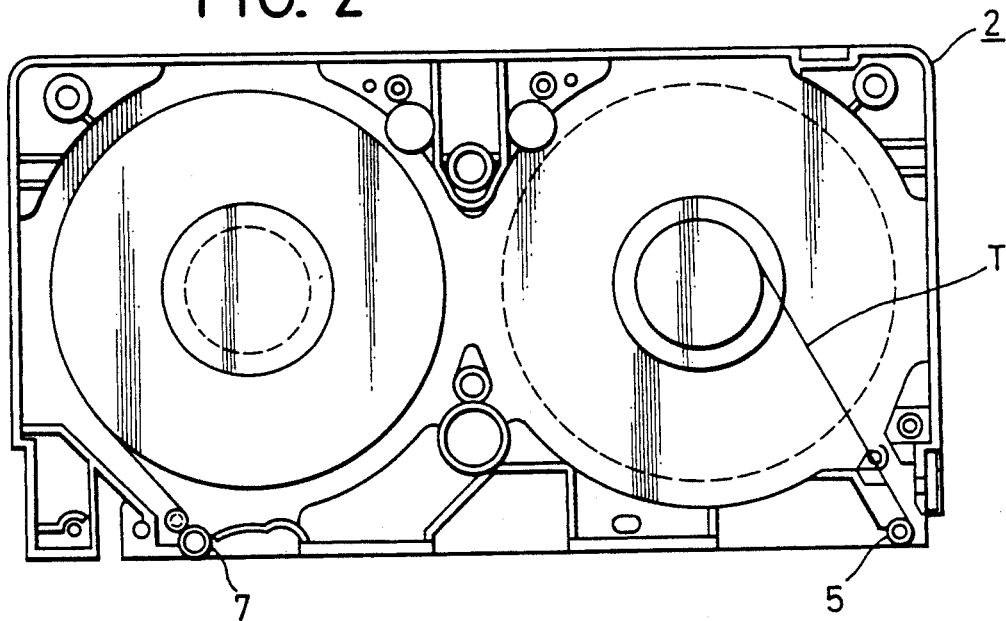
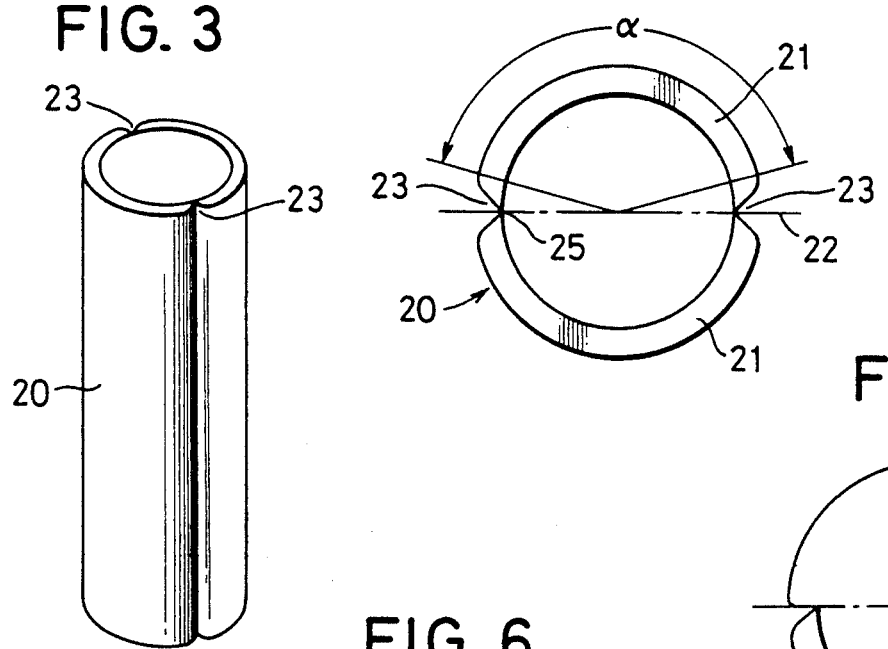
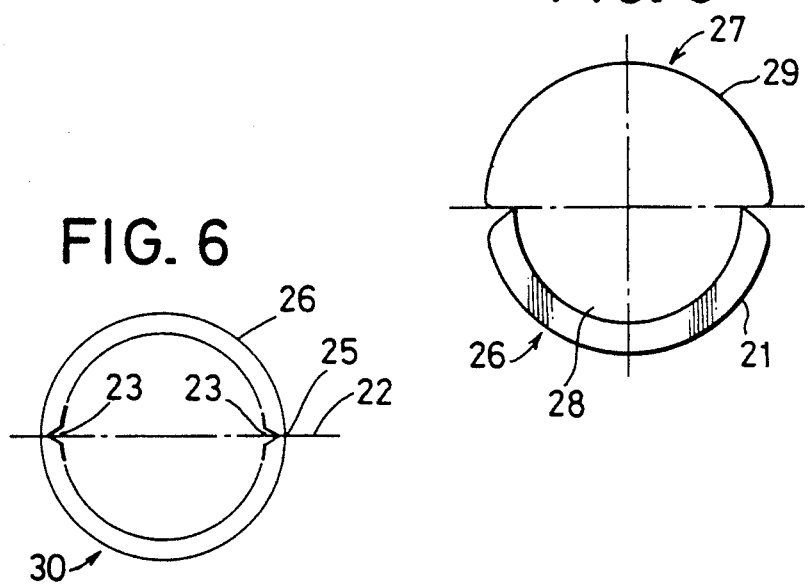

TAPE GUIDES AND METHOD OF MANUFACTURING THE SAME

BACKGROUND OF THE INVENTION

This invention relates to tape guides for use in magnetic tape cassettes, and more particularly to high-precision magnetic tape guides of a material-saving type and also to a method of manufacturing the same.

Magnetic tape cassettes commonly use tape guides for guiding a magnetic tape within the cassette housing. FIG. 1 illustrates typical tape guides used in a magnetic tape cassette of the VHS system. As shown, the magnetic tape cassette comprises an upper housing section 1 and a lower housing section 2 which are mated together, with a front lid 3 pivotally connected to the front part of the upper housing section to form a closed cassette housing, a pair of reels held within the housing, each reel having a set of lower and upper flanges 4, 6 or 5, 7, a presser plate spring secured to the inner surface of the upper housing section 2 to exert a pressure against the reels in position, and a length of magnetic tape 9 affixed to and wound on the reels so as to be drawn out to pass an open front region of the housing. Numeral 10 designates a window panel adapted to fit in a see-through window of the upper housing section 10.

Along the path of the magnetic tape are located various guide members. In the front part of the lower housing section 1, there is set upright a pin 11 of plastics or metal, over which is fitted a plastic guide roller 12. Another plastic pin 13 is fitted with a tubular guide 14 of stainless steel. Similarly, a plastic pin 15 is encased in a stainless steel tubular guide 16. A metal pin 17 also is provided.

Thus at least one of the magnetic tape guides consists of a metal tube. Such a guide has the disadvantage of increasing the material cost accordingly.

As an attempt to overcome the problem it has been proposed, for example, by Japanese Utility Model Application Publication NO. 5660/1986, fix an arcuate metal leaf on a support post of plastics or the like. The method reduces the material cost but is unable to secure adequate dimensional accuracy required of the guide. This is because polishing the arcuate metal leaf with high precision involves difficulties, and if the end is to be attained anyhow, additional expenditure will be necessary for the polishing process.

SUMMARY OF THE INVENTION

It is therefore an object of the present invention to provide tape guides of a material-saving type for magnetic tape cassettes and also a method of manufacturing the same.

Another object of the invention is to provide tape guides made with an economy of material while maintaining high accuracy and also a method of manufacturing the same.

These objects are realized, in accordance with the invention, by providing a method of manufacturing tape guides for magnetic tape cassettes which comprises forming grooves on at least either of the inner and outer surfaces of a cylindrical tube of a predetermined diameter, along a plane including the longitudinal axis of the tube if necessary precision polishing the surface, and thereafter dividing the tube into two halves along the grooves, so that each half of the tube can be securely fitted over a support post of a magnetic tape cassette.

The invention also provides tape guides manufactured in this way.

According to this invention, an economy of expensive metal material can be achieved and roundness of high accuracy essential for guides attained without difficulty.

In another aspect of the invention, a method is provided for manufacturing tape guides which comprises forming by drawing or other irregular-shape forming technique a metal tube having ribs formed along a plane including the longitudinal axis of the tube, each rib being defined by a combination of a recess on the outer side and a corresponding inward protrusion on the inner side of the tube, and thereafter dividing the tube along the longitudinal axis into two halves, in such a manner that the ribs of each half can be securely fitted in corresponding grooves or recesses of a support post of a magnetic tape cassette. The present invention further provides tape guides thus obtained.

BRIEF DESCRIPTION OF THE DRAWINGS

FIG. 2 is a plane view explanatory of the limitations to the dimensions of a tape according to the invention;

FIG. 3 is a perspective view of a metal tube during the course of fabrication into a tape guide member embodying the invention;

FIG. 4 is an enlarged plan view of the metal tube;

FIG. 5 is an enlarged plan view of the same embodiment of tape guide as mounted on a support post;

FIG. 6 is an enlarged plan view of a metal tube in the course of manufacture as a second embodiment of the invention;

DETAILED DESCRIPTION OF THE INVENTION

Figure 1:
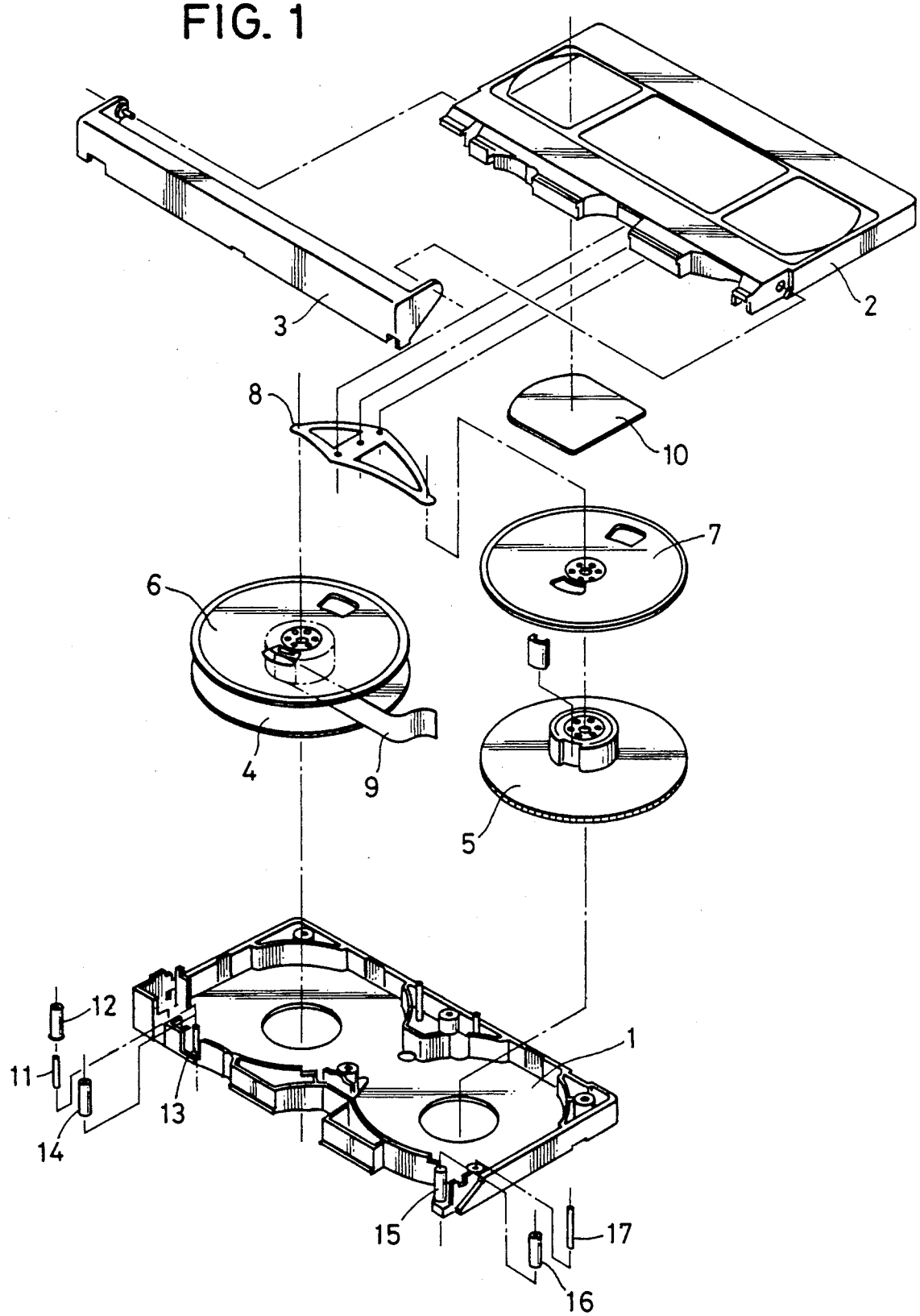
FIG. 1 is an exploded view of a magnetic tape cassette equipped with conventional tape guides.

According to this invention, tape guides are formed from a plastic material having good wear resistance and lubricating properties, such as a plyacetal, nylon, polycarbonate, polyphenylene sulfide, ABS, or phenol. Alternatively, they are made of stainless steel, brass, copper, steel, aluminum, or other metal material.

Tape guides are manufactured by forming such a material by a suitable method into a tube having grooves formed on at least either the inner or outer surface. Under the invention the grooves are formed on at least either surface of the tube along lines which cross a plane including the longitudinal axis of the tube. Such grooves can be formed using a die of a proper opening contour, simultaneously with the extrusion, drawing, or other tube-forming process. As an alternative, a tubular preform may be machined to the grooved shape as desired. The grooves may be letter V- or U-shaped or may be configured otherwise. The grooves facilitate subsequent cutting of the tube into halves by a cutter because of their reduced wall thickness. However, they should be so formed as to retain sufficient wall thickness and rigidity to withstand the polishing operation.

The grooving is followed by precision polishing of the tube. Since the tube is polished while it maintains its generally cylindrical geometry, the operation is performed with very high accuracy. The polished tube may be further processed by electrolytic or electroless plating or other treatment. Mere precision polishing is necessary for a tube of material that requires no plating, coating, or other surface treatment, such as stainless steel or other rough metal of lubricating properties of a plastic material. In case when a tube is made of brass, copper, or a plastic which needs plating or other ornamental surface coat, the surface is roughly polished, coated by electrolytic or electroless plating, and then precision polished.

The processing thus far described is done before the tube is divided into two. In this way a high degree of roundness is maintained, precision of polishing insured, material cost reduced, and productivity enhanced.

Next, the tube is cut along the grooves into two halves. In order to facilitate the division it is essential that he tube be formed with the bottoms of the grooves sufficiently thin-walled as compared to the remainder of the tube wall. This permits the tube to be cut easily by a punching press, shearing cutter, or cutting tool.

According to yet another aspect of the invention, tape guides are manufactured by a process which basically consists in forming by drawing or other irregular-shaped forming technique a metal tube having a preselected cross-sectional contour in a mirror-image fashion or symmetric with respect to a plane extending through the longitudinal axis of the tube. The term "drawing" as used herein means a working process in which a metal tube to be drawn is charged at one end into a die having an opening of predetermined dimensions and is pulled through the die, with a mandrel of a desired cross-sectional geometry inserted in the tube.

It is important that the metal tube be formed so that the tube portions where the plane of symmetry intersects the tube are properly thinner than the remainder. This permits the finished tube to be easily cut into two halves by a shearing cutter or cutting tool.

Ribs to protrude inwardly along the plane of symmetry should be formed at points other than these thin-walled portions. As will be explained in connection with the embodiments below, the metal tube according to the invention may be formed by either simply providing inward recesses or grooves along the line of symmetry or providing inwardly protruding ridges or ribs close to the both sides of the line of symmetry.

The invention will be more fully described below in connection with embodiments thereof.

Tape guides according to the invention can be used in the same way as those of conventional magnetic tape cassettes as illustrated in FIG. 1. Hence the construction of the cassette housing sections is not described in detail here. Care must, however, be taken to insure that, as shown in FIG. 2, the rounded portions of the tape guides 5, 7 make wider angles to the magnetic tape T than do the surfaces of the guides in contact with the tape.

FIRST EMBODIMENT

Referring to FIGS. 3 to 5, there is shown an embodiment of the invention using a metal tube. It will be obvious that the method of the invention is readily applicable to plastic tubes as well, with necessary modifications to the embodiment shown. As illustrated in FIGS. 3 and 4, a metal tube of a desired cross-sectional contour is made first by an irregular-shape forming technique. Alternatively, an ordinary cylindrical metal tube may be machined to form grooves on the outer surface along a plane including the axis of the tube. In either case, as shown on an enlarged scale in FIG. 4, the metal tube 20 is configured in a mirror-image fashion with respect to a plane 22 extending across the axis of the tube, providing two grooves 23 opposite to each other along the plane 22. The grooves, machined or otherwise formed to a depth corresponding to more than a half of the wall thickness, leave thin-walled portions 25 behind to maintain the cylindrical configuration of the tube. Although the grooves are shown V-shaped, they may be U-shaped instead. Throughout the outer surface except the grooves, the tube has two rounded portions 21 of a predetermined diameter. Each rounded portion extends over an angle -60, which is wider than the angle over which the outer surface portion of the tube is in contact with the magnetic tape.

The rounded portions 21 are then polished on the outer surface for added roundness. Since the metal tube can be polished while being rotated in position, as supported by jigs of a polishing machine, good machining accuracy is maintained. In case of a brass work, a desirable practice is to machine it in this way and finish it with electroplating. More desirably, the plated surface is finished by precision polishing. With a stainless steel work, machining up to the precision finish is recommended.

The metal tube, thus irregularly shaped and finished with high precision, is then cut along the plane 22 into halves by a cutter. In this manner two pieces of identical shape and size are obtained as metal guide members 26. The thin-walled portions constituting the bottoms of the grooves facilitate the cutting. Each guide member 26 so obtained, with a cross-sectional contour shown has hatched in FIG. 5, consists of a rounded portion 21 and thin-walled portions along both edges. On the other hand, the magnetic tape cassette has support posts 27 of plastics or the like either formed in one piece with the cassette housing or provided as separate attachments. As shown in FIG. 5, each post consists of a portion 28 having an outer surface conforming to the internal contour of the guide member 26 and a portion 29 having a diameter substantially equal to that of the rounded portion 21 of the guide member. The both edges of the tape guide member 26, therefore, are restricted by the portion 29 of the support post.

In assembling, the tape guide member 26 is forced onto the support post 27 in the position shown in FIG. 5, with the upper and lower ends of the member secured to the post by suitable fixing means. In this way a tape guide according to the invention is completed.

It is possible to use a support post having a portion 29 of a shorter diameter than that shown.

SECOND EMBODIMENT

In FIG. 6 is shown a tube 30 for a tape guise as the second embodiment of the invention. A modification of the first embodiment, the tube has grooves 23 formed on the inner surface. Accordingly, thin-walled portions 25 are on the outer side. In this case the tube must be made by irregular-shaped forming. Polishing is made easier than for the preceding embodiment As a further modification the grooves may be formed on both the outer and inner sides of the tube.

THIRD EMBODIMENT

Figure 7:
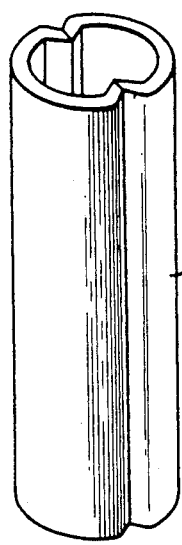
FIG. 7 is a perspective view of a metal tube during fabrication into a tape guide as a third embodiment of the invention.
Figure 8:
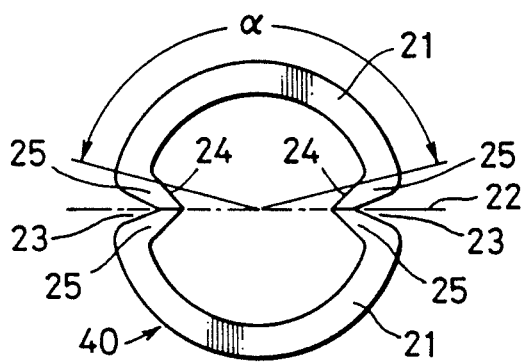
FIG. 8 is an enlarged plan view of the metal tube.

Referring to FIGS. 7 to 10, more specifically to FIGS. 7 and 8, a metal tube of a desired cross-sectional contour is made first by an irregular-shaped forming method. As the enlarged view in FIG. 8 shows, the metal tube 40 is configured in a mirror-image fashion with respect to a plane 22 extending through the axis of the tube. Along the plane 22, there are formed inwardly recessed faces 23 on the outer side and correspondingly inwardly protruded or raised faces 24 on the inner side. These recessed, and protruded faces combinedly form a pair of inwardly protruding ribs 25 symmetrically on the opposite edges of the plane 22, with each combination of the recessed and protruded faces connected by a thin-walled portion at the inwardly protruded edge. These protruding ribs connect rounded portions 21 of a predetermined diameter. Each rounded portion extends over an angle α wider than the angle of contact with the magnetic tape.

Next, the rounded portions 21 are polished on the outer surface by a polishing machine to attain more precise roundness. Good machining accuracy is obtained because the metal tube is supported by jigs of the machine and can be polished while being rotated. A metal tube made of brass is desired to be electroplate with chromium or the like following this polishing as preparatory surface machining. More desirably, the plate surface is precision polished as final finish. In case of a stainless steel tube, polishing up to the precision finish gives satisfactory result.

In the manner described, the shaped metal tube is finished with good accuracy. The process proceeds to the next step, where the metal tube is cut along the plane 22 into halves by a cutter. Two metal guide members 26 of the same shape and size are thus obtained. The inwardly protruding thin-walled portions make the cutting easy. The resulting guide members 26, with a cross section as shown hatched in FIG. 5, consist of a rounded portion 21 and a pair of ribs 25 inwardly protruding along both edges of the rounded portion.

On the other hand, the magnetic tape cassette has support posts 27 of plastics or the like either formed in one piece with the cassette housing or provided as separate attachments. As shown in FIG. 5, each post consists of a portion 28 have an outer surface conforming to the internal contour of the guide member 26 and a portion having a diameter substantially equal to that of the rounded portion 21 of the guide member. The post is thus formed with grooves into which the ribs 25 fit.

Onto this support post 27 is axially forced the tape guide member 26, thus completing the assembly of a tape guide in according with the invention.

Figure 10:
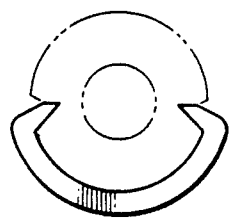
FIG. 10 is a plan view similar to FIG. 9 showing a modification of the support post.

The support post may have a smaller diameter than has been described, such as shown in FIG. 10.

FOURTH EMBODIMENT

Figure 11:
FIG. 11 is a perspective view of a metal tube during fabrication into a tape guide as a fourth embodiment of the invention.
Figure 12:
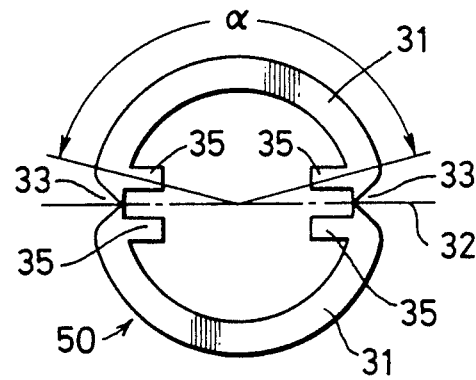
FIG. 12 is plan view of the metal tube.
Figure 9:
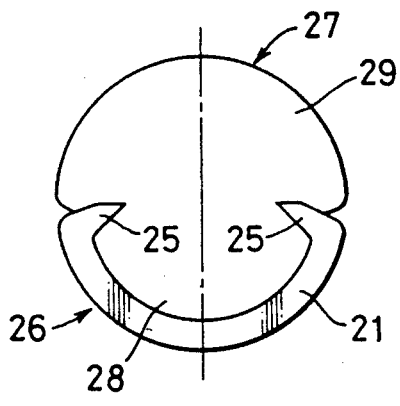
FIG. 9 is an enlarged plan view of the third embodiment of tape guide as mounted on a support post.

Refer now to FIGS. 11 to 14. First, as shown in FIGS. 11 and 12, a metal tube of a desired cross-sectional contour is made by an irregular-shape forming technique. As shown exaggeratedly in FIG. 12, the metal tube 50 is generally cylindrically shaped, with a cross-sectional contour such that the inside and outside diameters substantially uniform throughout, and is configured in a mirror-image fashion with respect to a plane 32 extending through the axis of the tube. Along the plane 32, there are formed inwardly recessed faces 33. On the inner side of the tube, inwardly protruding ribs 35 are formed in two pairs, each extending along, and substantially in parallel with, the both sides of the plane 32. The tube wall portion between the ribs of each pair are made thin by the recessed face 33. These ribs and recessed portions are contiguous to rounded portions 31 of a predetermined diameter. Each rounded portion extends over an angle α wider than the angle of contact with the magnetic tape.

Next, the rounded portions 31 are polished on the outer surface by a polishing machine to attain more precise roundness. The machining accuracy is high because the metal tube i supported by jigs of the machine so that it can be polished while being rotated. In case of a brass workpiece, it is desired to be electroplated with chromium or the like following this polishing as preparatory surface machining. Preferably, the plated surface is precision polished as final finish. When the material is stainless steel, polishing to the precision finish is desirable.

In the manner described, the metal tube of irregular shape is finished with good accuracy. In the next step, the metal tube is cut along the plane 32 into halves by a cutter. Two metal guide members 36 of the same shape and size are thus obtained. The thin-walled portions make the cutting easy. The resulting guide members 36, with a cross section as shown hatched in FIG. 13, consist of a rounded portion 31 and a pair of ribs 35 inwardly protruding along both edges of the rounded portion.

Figure 13:
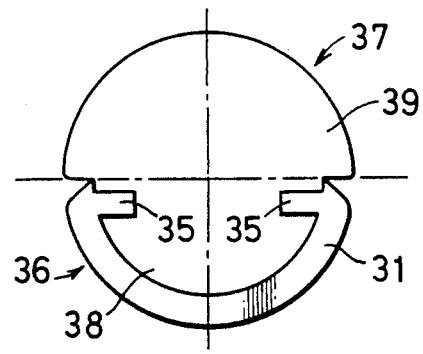
FIG. 13 is a plane view of the fourth embodiment of tape guide as mounted on a support post.

On the other hand, the magnetic tape cassette has support posts 37 of plastics or the like either formed in one piece with the cassette housing or provided as separate attachments. As shown in FIG. 13, each post consists of a portion 38 having an outer surface conforming to the internal contour of the guide member 36 and a portion 39 having a diameter substantially equal to that of the rounded portion 31. The post is thus formed with grooves into which the ribs 35 fit.

Onto this support post 37 is axially forced the tape guide member 36, thus completing the assembling of a tape guide in accordance with the invention.

Figure 14:
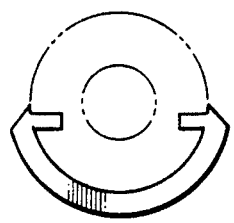
FIG. 14 is a plan view similar to FIG. 13 showing a modification of the support post.

The support post may have a smaller diameter than has been described, such as shown in FIG. 14.

As will be understood from the foregoing description, the present invention renders it possible to obtain tape guides from round tubes easily with high accuracy and with an economy of material. The invention thus overcomes the problem of inadequate machining accuracy common to existing tape guides of the material-saving type.

What is claimed is:

1. A tape guide for a magnetic tape cassette which comprises one half of a thin-walled cylindrical metal tube divided along a plane including the longitudinal axis of the tube, and a support post around which said half is fitted securely.

2. A tape guide according to claim 1, further comprising inwardly protruding longitudinally extending ribs on diametrically opposite sides of each said half, and said support posts having corresponding recesses for receiving said ribs for holding said half in place on said support posts.

3. A tape guide according to claim 1 or 2 wherein said metal tube is a brass tube plated on an outer surface thereof.

4. A tape guide according to claim 1 or 2 wherein said metal tube is made of stainless steel.

5. A method of manufacturing a tape guide for a magnetic tape cassette, comprising the steps of
providing a cylindrical tube having preselected inner and outer diameters;
dividing the tube along a plane including the longitudinal axis of the tube into two halves; and
securing one of the halves to a support post.

6. A method according to claim 5, further comprising the step of forming diametrically opposite pairs of inwardly protruding longitudinally extending ribs on said tube, said pairs of ribs straddling said plane.

7. A method of manufacturing a tape guide for a magnetic tape cassette, comprising the steps of
forming in a selected one of the inner or outer surfaces of a cylindrical tube diametrically opposite longitudinally extending grooves along a plane including the longitudinal axis of the tube,
dividing the tube along a longitudinal center line of the grooves into two halves, and
securing one of the halves to a support post.

8. Method according to claim 7, wherein the step of forming said grooves comprises forming said grooves simultaneously with forming said metal tube.

9. Method according to claim 7, further comprising the step of finishing the surface of said tube prior to dividing it into halves.

10. Method according to claim 9, wherein the step of finishing the surface of said tube comprises plating.

11. Method according to claim 9, wherein said step of finishing the surface of said tube comprises precision polishing.

* * * * *